United States Patent
Froeschl et al.

(10) Patent No.: US 7,852,042 B2
(45) Date of Patent: Dec. 14, 2010

(54) METHOD OF MONITORING AND/OR CONTROLLING OR AUTOMATICALLY CONTROLLING THE VOLTAGE OF AT LEAST ONE GROUP OF CELLS IN A COMPOUND OF CELLS OF AN ENERGY STORAGE DEVICE

(75) Inventors: Joachim Froeschl, Herrsching (DE); Sebastian Scharner, Tuerkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/188,125

(22) Filed: Aug. 7, 2008

(65) Prior Publication Data

US 2009/0034159 A1    Feb. 5, 2009

Related U.S. Application Data

(63) Continuation of application No. PCT/EP2007/000972, filed on Feb. 5, 2007.

(30) Foreign Application Priority Data

Feb. 7, 2006    (DE) .................. 10 2006 005 334

(51) Int. Cl.
  *H01M 10/44*    (2006.01)
  *H01M 10/46*    (2006.01)
(52) U.S. Cl. .................. 320/101; 320/103; 320/116; 320/124
(58) Field of Classification Search .................. 320/101, 320/104, 103, 124; 307/10.7
  See application file for complete search history.

(56) References Cited

U.S. PATENT DOCUMENTS

| | | | |
|---|---|---|---|
| 5,469,042 A | 11/1995 | Ruehling | |
| 6,014,013 A | 1/2000 | Suppanz et al. | |
| 6,133,707 A * | 10/2000 | Kikuchi et al. | 320/104 |
| 6,181,101 B1 * | 1/2001 | Arai et al. | 320/104 |
| 6,184,656 B1 * | 2/2001 | Karunasiri et al. | 320/119 |
| 6,219,221 B1 | 4/2001 | Kibi et al. | |
| 6,232,743 B1 * | 5/2001 | Nakanishi | 320/104 |
| 6,310,408 B1 | 10/2001 | Hermann | |
| 6,377,023 B1 | 4/2002 | Capel | |
| 6,377,024 B1 | 4/2002 | Choy | |

(Continued)

FOREIGN PATENT DOCUMENTS

| | | |
|---|---|---|
| CH | 643 095 A5 | 5/1984 |
| DE | 42 25 746 A1 | 2/1994 |
| DE | 44 38 836 A1 | 4/1995 |
| DE | 197 33 866 A1 | 2/1999 |
| DE | 198 43 417 A1 | 4/1999 |

(Continued)

OTHER PUBLICATIONS

German Search Report dated Jul. 25, 2006 with English translation of relevant portion (nine (9) pages).
International Search Report dated Jun. 19, 2007 w/English translation (six (6) pages).

*Primary Examiner*—Edward Tso
*Assistant Examiner*—Arun Williams
(74) *Attorney, Agent, or Firm*—Crowell & Moring LLP

(57) ABSTRACT

Thus, according to the invention, for monitoring and/or controlling or automatically controlling the voltage of at least one group of cells in a cell compound of an energy storage device, particularly an energy storage device in an onboard power supply system of a motor vehicle, a data communication is carried out between a central logic and a cell group logic by way of the rail line connecting the latter, in which case voltage levels exist between an idle level situated at or above a maximal voltage level, up to which the cell group logic exchanges energy with the rail line for charging or discharging the cell group, and a data level situated above the idle level.

15 Claims, 8 Drawing Sheets

U.S. PATENT DOCUMENTS

| | | |
|---|---|---|
| 6,404,165 B1 | 6/2002 | Shinpo et al. |
| 6,583,599 B1 * | 6/2003 | Phillips et al. .............. 320/104 |
| 6,696,815 B1 * | 2/2004 | Kikuchi ....................... 320/104 |
| 6,700,349 B2 * | 3/2004 | Emori et al. ................. 320/104 |
| 6,710,575 B2 * | 3/2004 | Youn .......................... 320/104 |
| 6,744,820 B1 | 6/2004 | Khairallah et al. |
| 6,943,525 B2 * | 9/2005 | Toya et al. .................. 320/104 |
| 6,946,816 B2 * | 9/2005 | Pfab et al. ................... 320/104 |
| 7,019,488 B2 * | 3/2006 | Nakao ......................... 320/104 |
| 2002/0190690 A1 * | 12/2002 | Tamai et al. ................ 320/103 |
| 2004/0135546 A1 * | 7/2004 | Chertok et al. .............. 320/118 |
| 2004/0164706 A1 * | 8/2004 | Osborne ...................... 320/116 |
| 2005/0001582 A1 * | 1/2005 | Goto et al. .................. 318/802 |

FOREIGN PATENT DOCUMENTS

| | | |
|---|---|---|
| DE | 199 22 948 B4 | 12/1999 |
| DE | 199 48 765 A1 | 1/2001 |
| EP | 0 219 120 A2 | 4/1987 |
| EP | 1 094 589 A1 | 4/2001 |
| EP | 1 372 270 A1 | 12/2003 |
| WO | WO 03/092186 A1 | 11/2003 |

* cited by examiner

METHOD OF MONITORING AND/OR CONTROLLING OR AUTOMATICALLY CONTROLLING THE VOLTAGE OF AT LEAST ONE GROUP OF CELLS IN A COMPOUND OF CELLS OF AN ENERGY STORAGE DEVICE

This application is a continuation of PCT International Application No. PCT/EP2007/000972, filed on Feb. 5, 2007, which claims priority under 35 U.S.C. §119 to German Application No. 10 2006 005 334.6, filed Feb. 7, 2006, the entire disclosures of which are expressly incorporated by reference herein.

BACKGROUND AND SUMMARY OF THE INVENTION

The invention relates to a method of monitoring and/or controlling or automatically controlling the voltage of at least one group of cells in a compound of cells of an energy storage device, which consists of a series connection of the individual cells of the energy storage device, in which case an individual cell may consist of one cell or of parallel-connected cells. In particular, the invention relates to a compound of cells of an energy storage device in an onboard power supply system of a motor vehicle. The invention further relates to a cell group logic for monitoring and/or controlling or automatically controlling the voltage of at least one group of cells in a compound of cells of an energy storage device, particularly of an energy storage device in an onboard power supply system of a motor vehicle, as well as to a central logic for monitoring and/or controlling or automatically controlling the voltage of at least one group of cells in a compound of cells of an energy storage device by way of a cell group logic, particularly of an energy storage device in an onboard power supply system of a motor vehicle.

Energy storage devices constructed of individual cells, preferably energy storage devices constructed of double-layer capacitors, are increasingly used in the automobile field. For providing and storing energy, these double-layer capacitors have the advantage that they can provide high power for a short time period. In order to arrive at the supply voltage required in a motor vehicle, the individual double-layer capacitors have to be connected in series. The series-connected cells thereby form a compound of cells. For charging, for balancing the cell voltage, for detecting the undervoltage and overvoltage of individual cells, for maintaining the charge of the cells in the standing operation, for the charging and discharging or the charge reversal between the individual cells as well as for the diagnosis/monitoring of the individual cells, individual cells or groups of cells are connected with respective cell group logics, which can receive energy from or feed energy to a rail line connected with these logics, in order to charge or discharge the individual cells or groups of cells. In the following, it will be described that each cell group logic is connected with a group of cells in order to monitor and/or control or automatically control their voltage. Here, the term "group of cells" comprises also individual cells, so that a case is also described in which a cell group logic is connected to each individual cell of a cell compound of an energy storage device in order to monitor and/or to control or to automatically control its voltage.

So that the cell voltages of the individual cells or groups of cells do not diverge during the cyclical charging or discharging, it is known to monitor the cell group logics by means of a higher-ranking automatic control device, specifically a central logic, and to control it such that a uniform charging and/or discharging is achieved, whereby a long service life of the individual cells and thus of the entire cell compound can be reached. The cell group logics are normally connected with the central logic by way of a data line, so that a data communication can take place for ensuring the described function.

However, this data line results in increased wiring expenditures and therefore in an increased susceptibility to faults. For reducing the wiring expenditures and the susceptibility to faults, many different methods of also transmitting data by way of existing supply lines are known, particularly in the automobile field. For this purpose, data to be transmitted between electronic devices are generally modulated upon the supply voltage lines. However, because of the resulting voltage level difference especially in the sphere of monitoring the voltage of individual cells at a cell compound, such an approach is unsuitable because measuring results or reference voltage levels impressed onto the supply lines, which are used for charging or discharging the cell groups or individual cells, are hereby falsified.

German Patent Document DE 197 33 866 A1, in contrast, describes a method and a system improved with respect to the above for transmitting data in a motor vehicle, where a satellite station is supplied with power by a central station by way of a data transmission line used jointly for the data transmission and the power supply. Here, the data transmission does not lead to a readjustment of a generator, so that the average voltage on the data transmission line (quiescent voltage) is not changed. However, since also here the data signals to be transmitted are simply superimposed on the quiescent voltage of the data transmission line in the form of current pulses which, even in the case of a small quantity, because of the high (output) resistance of the generator, result in strong voltage pulses, which are therefore easily detectable on the receiver side and which, on the receiver side, can easily be demodulated in a reliable manner by a comparator or a window comparator, it is also not possible here to carry out a power supply, which simultaneously defines a reference voltage level, by way of the data transmission line used for the data transmission and the power supply.

Thus, by means of the existing methods and systems for the data transmission on supply lines, no reliable monitoring and/or controlling or automatic controlling of the voltage of individual cells in a cell compound of an energy storage device, particularly of an energy storage device in an onboard power supply system of a motor vehicle, can be carried out where the voltage is determined for each group of cells and the group of cells is charged and/or discharged as a function of the determined voltage, at which voltage each group of cells is connected with a cell group logic, and by way of each group of cells, the cell group voltage is determined and, in the cell group logic, is compared with a desired voltage applied to a direct-voltage line with respect to the ground, and the group of cells is charged and/or discharged as a function of the difference between the determined cell group voltage and the desired voltage by way of the direct-voltage line, because the desired voltage would be falsified because of the data transmission.

It is an object of the invention to indicate an improved method of monitoring and/or controlling or automatically controlling the voltage of at least one group of cells in a cell compound of an energy storage device, particularly an energy storage device in an onboard power supply system of a motor vehicle, whereby a data communication can take place by way of the supply line of the cell group logics (rail line). It is also an object of the invention to indicate a cell group logic suitable for this purpose as well as a central logic suitable for this purpose.

The method according to the invention for monitoring and/or controlling or automatically controlling the voltage of at least one group of cells in a cell compound of an energy storage device, particularly of an energy storage device in an onboard power supply system of a motor vehicle, the group of cells being connected with a cell group logic by way of a supply line by which the group of cells is charged or discharged, which cell group logic monitors and/or controls or automatically controls the voltage of the group of cells, the cell group logic for the charging or discharging of the group of cells taking energy from a rail line or feeding energy to a rail line, and a communication between the cell group logic and another cell group logic and/or a central logic taking place by way of the rail line, is characterized in that a data communication is carried out with voltage levels between an idle level situated at or above a maximal voltage level, up to which the cell group logic exchanges energy with the rail line for charging or discharging the group of cells, and a data level situated above the idle level.

The cell group logic according to the invention for monitoring and/or controlling or automatically controlling the voltage of at least one group of cells in a cell compound of an energy storage device, particularly an energy storage device in an onboard power supply system of a motor vehicle, the group of cells being connected with a cell group logic by way of a supply line by which the group of cells is charged or discharged, which cell group logic monitors and/or controls or automatically controls the voltage of the group of cells, the cell group logic for the charging or discharging of the group of cells taking energy from a rail line or feeding energy to a rail line, and a communication of the cell group logic and another cell group logic and/or a central logic taking place by way of a rail line, is characterized by a voltage comparator unit which carries out a data communication by way of the rail line when voltage levels between an idle level situated at or above a maximal voltage level, up to which the cell group logic exchanges energy with the rail line for charging or discharging the group of cells, and a data level situated above the idle level are applied to the rail line.

The central logic according to the invention for monitoring and/or controlling or automatically controlling the voltage of at least one group of cells in a cell compound of an energy storage device by way of a cell group logic, particularly an energy storage device in an onboard power supply system of a motor vehicle, the group of cells being connected with a cell group logic by way of a supply line by which the group of cells is charged or discharged, which cell group logic monitors and/or controls or automatically controls the voltage of the group of cells, the cell group logic for the charging or discharging of the group of cells taking energy from a rail line or feeding energy to a rail line, and a communication taking place between the cell group logic and another cell group logic and/or a central logic by way of a rail line is characterized by a voltage converter unit which carries out a data communication by way of the rail line in that voltage levels between an idle level situated at or above a maximal voltage level, up to which the cell group logic exchanges energy for charging or discharging the group of cells with the rail line, and a data level situated above the idle level are impressed upon the rail line.

The above-mentioned cell group is either an individual cell or a compound of several individual cells, the number of cells in the group of cells in each case being smaller than the entire cell compound. For reasons of cost and expenditures, it makes sense to combine several cells in a group of cells and to determine the data for a group of cells instead of each individual cell. Advantageously, the cells are double-layer capacitors. The method, the cell group logic and the central logic are, however, also suitable for any other type of energy storage device constructed of individual cells. The cell group logic advantageously is a unit which, in addition to the voltage comparator unit, also has a control unit for charging and/or discharging the cell or group of cells. The voltage applied to the cell or group of cells can be determined directly in the cell group logic or in the central logic. The voltage control or automatic control of the cells is advantageously used for maintaining the charge as well as for balancing the voltage of the individual cells. In the above-mentioned implementation of the cell group logic and of the central logic, the central logic can transmit commands to the cell group logic during the data communication because the central logic can impress certain voltage levels onto the rail line and the cell group logic can detect the voltage levels of the rail line. When a bidirectional data communication is desirable, a voltage converter unit for impressing certain voltage levels can naturally also be provided in the cell group logic, and a voltage comparator unit for detecting voltage levels can naturally also be provided in the central logic.

Thus in comparison to the known state of the art, the method according to the invention, the cell group logic according to the invention and the central logic according to the invention have the advantage that the rail line can be used for supplying the cell group logic with a reference voltage by way of which the cell group logic can also be supplied with power, as well as for a data communication between the central logic and the cell group logic without interfering with the reference voltage. According to the invention, this takes place in that the data communication takes place by means of voltage levels which are above the maximal voltage level, up to which the cell group logic exchanges energy with the rail line for charging or discharging the cell group; that is, up to which the rail line is used for "transmitting" the reference voltage. When the maximal voltage level is exceeded, the cell group logic no longer exchanges energy with the rail line for charging or discharging the cell group connected therewith, and the voltage applied to the rail line is no longer used as reference voltage for the charging or discharging of the cell groups or the individual cells; that is, the supply line, by way of which the cell group is connected with the cell group logic, is definitely separated from the rail line. As a result, the charging or discharging of the group of cells is carried out by means of an unadulterated reference voltage and, during the data communication, the charging or discharging of the group of cells is interrupted in order to exclude a faulty charging or discharging.

The cell group logic is advantageously switched to active when a rail voltage is applied to the rail line which is above an enable voltage level situated below the maximal voltage level. The cell group logic is therefore advantageously constructed such that the voltage comparator unit switches the cell group logic to active when a rail voltage is applied to the rail line which is above an enable voltage level situated below the maximal voltage level. The central logic therefore advantageously has a control unit which drives the voltage converter unit to impress a rail voltage which is above an enable voltage level situated below the maximal voltage level in order to switch the cell group logic to active. In this advantageous embodiment, the cell group logics are compulsorily switched to passive, that is, disabled, in the event of a "short circuit to ground" fault. In this manner, a destruction of or damage to the individual cell groups is prevented.

According to the invention, the supply line of the cell group is advantageously connected such with the rail line that a power is transmitted between the latter which is situated at or above a first power level when the rail voltage is above the enable voltage level or a low voltage level situated above the enable voltage level and below a higher high-voltage level or the still higher maximal voltage level.

Also advantageously, the supply line of the cell group is connected according to the invention with the rail line in such a manner that a power is transmitted between the latter which is at or above a second power level situated above the first power level when a cell group voltage is above the enable voltage level and below the low voltage level or above the high voltage level and below the maximal voltage level.

According to the invention, the supply lines of different cell groups are advantageously connected such with the rail line that power is transmitted between the different cell groups and/or power is taken from the rail line or is fed to this rail line.

For this power transmission between the cell groups or at least one cell group and the rail line, the cell group logic according to the invention advantageously has a switch unit which is triggered by the voltage comparator unit and can connect the supply line of the cell group such with the rail line that a certain power is transmitted, in which case the voltage comparator unit determines the removal or feeding of energy from the rail line or to the rail line by means of defined voltage levels existing on the rail line and by means of a cell group voltage. In the case of the central logic according to the invention, the voltage control unit advantageously drives the voltage converter unit for this purpose to impress a rail voltage which is above the enable voltage level in order to drive the cell group logic to connect the supply lines of different cell groups such with the rail line that power is transmitted between the different cell groups and/or power is taken from the rail line or is fed to this rail line.

By means of these functions, a balancing of the cell voltages as well as the detecting of under- and overvoltages of individual cells can take place. In addition, the charging of the cells can be maintained in the standing operation, a charging and discharging or charge reversal between the individual cells can take place, and the individual cells can be diagnosed/monitored.

In the case of a unidirectional data communication between the central logic and the cell group logic(s), for example, an instruction to a defined cell group logic can take place by means of the central logic to connect the supply line of the connected cell group with the rail line, while simultaneously the other cell group logics are instructed to separate the supply lines of the respective cell groups from the rail line. In this case, a targeted charging as well as a targeted discharging of the cell group connected with the rail like can take place by way of the rail line. Since the central logic can determine the removal of energy from the rail line and the feeding of energy to the rail line respectively, it can in this case also carry out a targeted diagnosis of an individual cell group with respect to its voltage, its resistance and its capacitance. In the case of a bidirectional communication between the central logic and the cell group logic(s), such a diagnosis can also take place by the cell group logic(s), in which case the information transmission can be carried out by way of the bidirectional communication mechanism.

According to the invention, the data communication advantageously comprises the address, the command, the data, the safety and/or the response. Also advantageously, the data and/or the response comprise the internal resistance, the capacitance, the temperature and/or the voltage of a cell group. According to the invention, the data communication advantageously takes place by way of a binary coding, an amplitude coding, a pulse duration coding and/or an amplitude-pulse duration coding.

Advantageously, the control unit according to the invention drives the voltage converter unit to carry out the data communication between the cell group logic and the central logic by way of the rail line.

Other objects, advantages and novel features of the present invention will become apparent from the following detailed description of the invention when considered in conjunction with the accompanying drawings.

DETAILED DESCRIPTION

Figure 1:
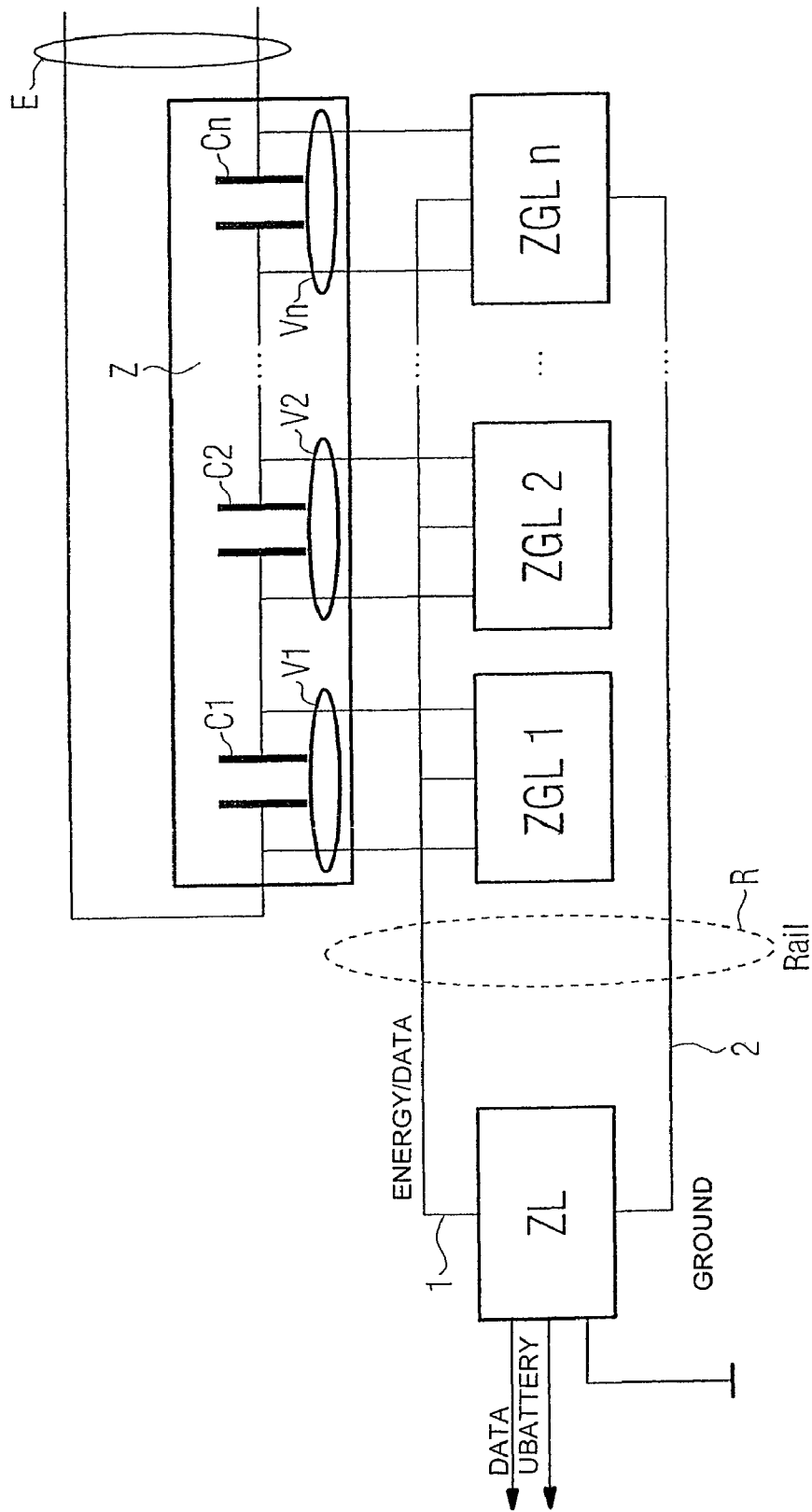
FIG. 1 is a view of a preferred embodiment of a system for implementing the method according to the invention.

FIG. 1 illustrates a preferred embodiment of the physico-technical construction of the system for implementing the method according to the invention. The system is implemented, for example, in a vehicle not shown here. In FIG. 1, several cells C1, C2, ... Cn are connected in series in a cell compound Z. The cell compound Z is connected to the onboard energy supply system E of the vehicle and is used for providing energy, mainly in the case of hybrid vehicles. The cells C1 to Cn advantageously are double-layer capacitors. Each cell C1 to Cn of the cell compound Z is connected with a respective cell group logic ZGL1, ZGL2, ..., SGLn.

In FIG. 1, the system is further developed such that each cell C1 to Cn forms a group of cells which is connected with its own cell group logic. The cell group logics ZGL1, ZGL2, ..., ZGLn are connected with a rail line R which has a conductor 1 for energy/data and a grounding conductor 2. The rail line R is connected with a higher-ranking central logic ZL, which is also connected with the battery voltage $U_{batt}$, the vehicle ground and a data bus of the vehicle.

Figure 2:
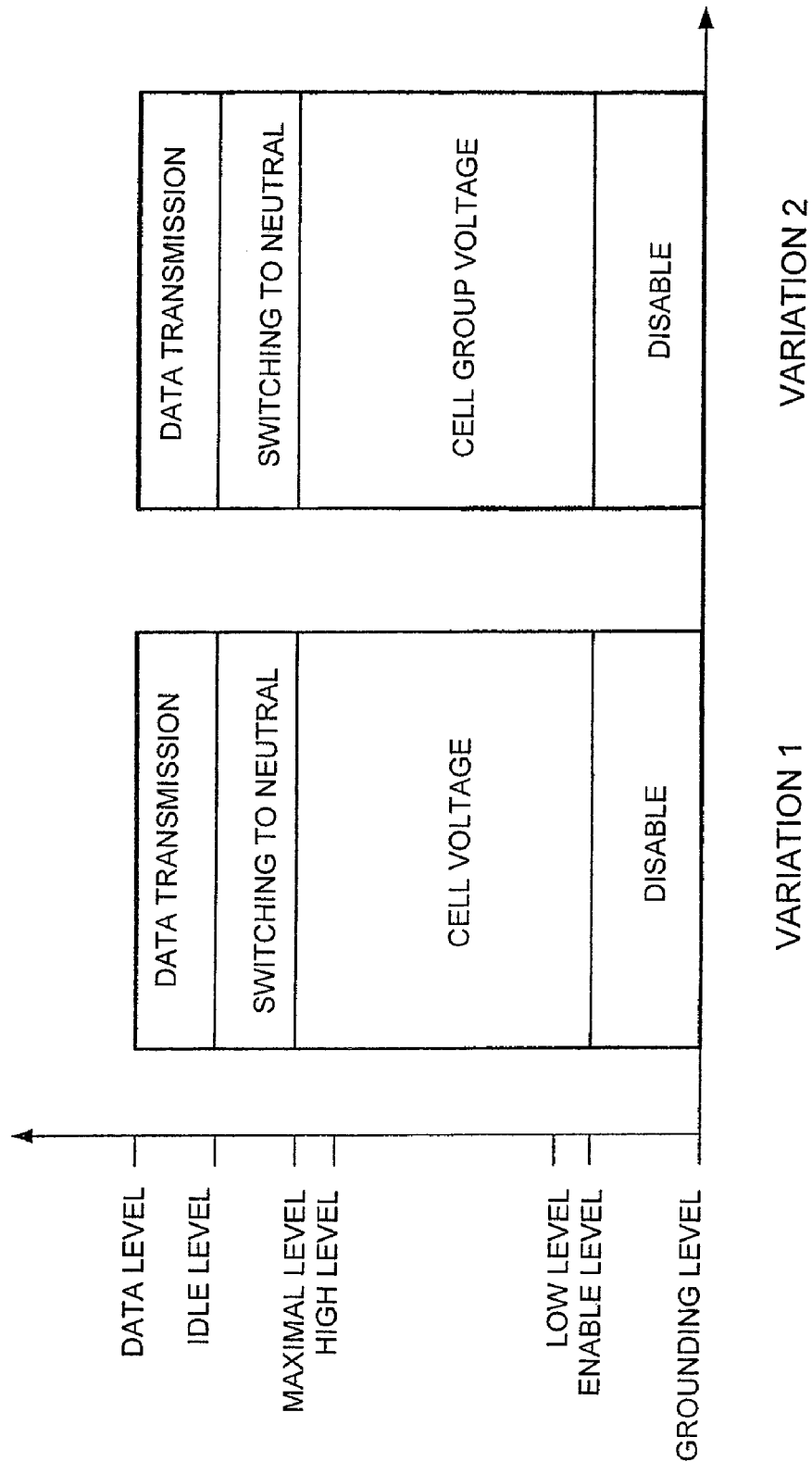
FIG. 2 is a view of a preferred embodiment of the coding of the information according to the invention.

FIG. 2 illustrates a preferred embodiment of the coding of information according to the invention in two variations, the first variation concerning the case shown in FIG. 1, in which each individual cell C1, C2, ..., Cn is connected with its own cell group logic ZGL1, ZGL2, ..., ZGLn, and the second variation concerning the case in which each cell group logic is connected with a series connection of several individual cells; thus, that a cell group consists not only of an individual cell but of several individual cells. The difference between the two variations is that, in the first variation, a cell voltage is between the enable level and the maximal level, while, in the second variation, a cell group voltage is between these levels.

For both variations, an enable level situated above the grounding level, a low level situated above the enable level, a high level situated above the low level, a maximal level situated above the high level, an idle level situated above the maximal level and a data level situated above the idle level are defined. In the case of a voltage level on the rail line between the grounding level and the enable level, the cell group logics are disabled, that is, switched off. Above the enable level, they are enabled, that is, switched to active. Between the enable level and the maximal level, in variation 1, the cell voltage and, in variation 2, the cell group voltage are controlled or automatically controlled by means of a reference voltage impressed on the rail line. Between the maximal level and the idle level, the cell group logics in both variations are switched to neutral and a data transmission takes place above the idle level. Low levels and high levels are used for detecting under- and overvoltages of individual cells or cell groups.

Figure 3:
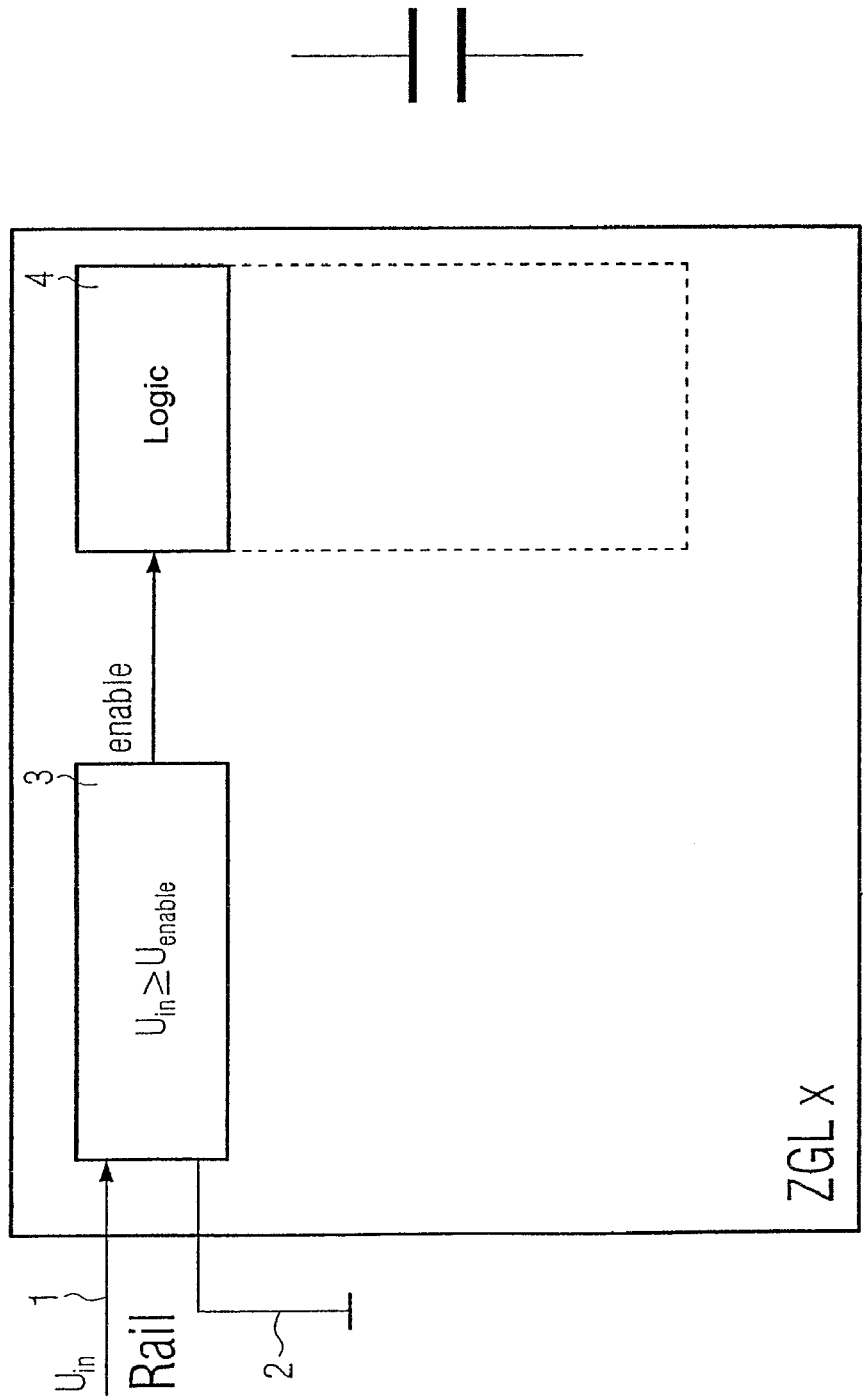
FIG. 3 is a preferred embodiment of the function of enabling according to the invention.

FIG. 3 illustrates a preferred embodiment of the active-switching of the cell group logics. A cell group logic ZGLx is switched to active when the voltage $U_{in}$ impressed on the energy/data conductor 1 is greater than or equal to the enable level $U_{enable}$. If this is not so, the cell group logic ZGLx is switched to passive, that is, disabled. In order to carry out this function, the cell group logic ZGLx comprises a voltage comparator unit 3 which compares the voltage $U_{in}$ applied to the energy/data conductor 1 with the enable level $U_{enable}$. In the event that the voltage $U_{in}$ impressed on the energy/data conductor 1 is greater than or equal to the enable level $U_{enable}$, a logic module 4 is activated, that is, enabled.

Figure 4:
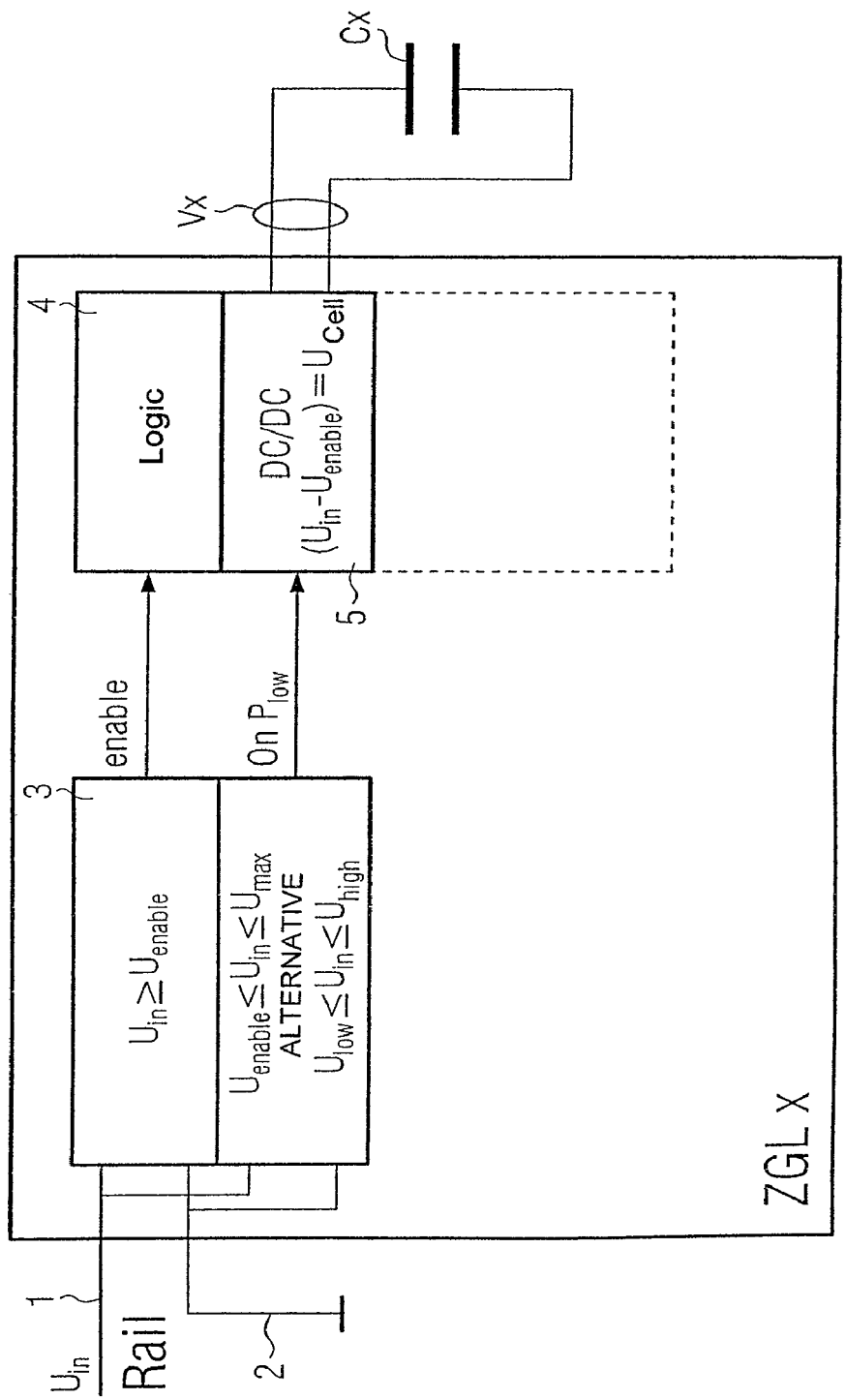
FIG. 4 is a view of a preferred embodiment of the function of balancing the cell voltages according to the invention.

FIG. 4 illustrates a preferred embodiment of the function of balancing the cell voltages according to the invention. In addition to the function illustrated in FIG. 3 and described in connection with the latter, the voltage comparator unit 3 monitors whether the voltage $U_{in}$ impressed on the energy/data conductor 1 is greater than or equal to the enable level $U_{enable}$3 and smaller than or equal to the maximal level $U_{max}$ or alternatively greater than or equal to the low level $U_{low}$ and smaller than or equal to the high level $U_{high}$. If this is so, a switch unit 5 enabled by the logic module 4—here, in the form of a DC-DC converter—is instructed to supply a low power $P_{low}$ to the cell Cx connected to the cell group logic ZGLx, in which case a cell voltage $U_{cell}$ is the input voltage impressed on the energy data conductor 1 minus the enable level $U_{enable}$. The balancing of the cell voltage takes place in the event that the interface voltage $U_{in}$ is in a voltage range above the enable level or the low level $U_{low}$ and below the maximal level or the high level $U_{high}$. The rail voltage reduced by the enable level is simultaneously also the cell voltage; as an alternative, the cell group voltage. In the event that the cell voltage is greater than the rail voltage reduced by the enable level, energy is transferred by means of the DC/DC converter 5 from the cell Cx into the rail R. If the cell voltage $U_{cell}$ is smaller than the rail voltage $U_{in}$ reduced by the enable level, the energy is transferred from the rail R into the cell Cx.

Figure 5:
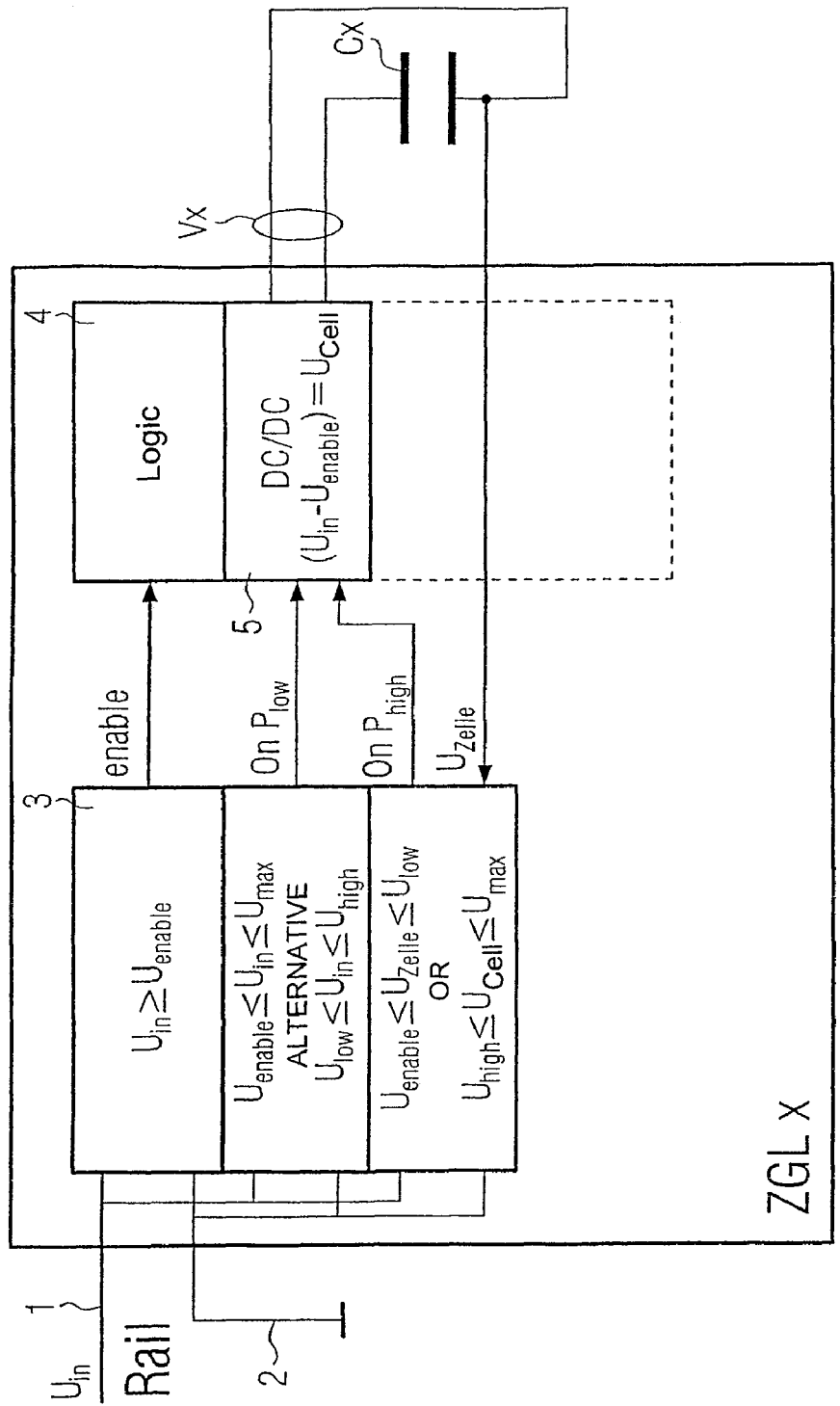
FIG. 5 is a view of a preferred embodiment of the function of detecting an underpressure and an overpressure according to the invention.

FIG. 5 shows a preferred embodiment of the functions of detecting undervoltage and overvoltage according to the invention. In addition to the function of the cell group logic ZGLx illustrated in FIG. 4 and described with respect to the latter, it is checked whether the cell voltage $U_{cell}$ is greater than or equal to the enable level $U_{enable}$ and smaller than or equal to the low level $U_{low}$ or greater than or equal to the high level $U_{high}$ and smaller than or equal to the maximal level $U_{max}$. If this is so, the switch unit 5 is instructed to feed a high power $P_{high}$ to the cell Cx or to remove a high power $P_{high}$ from the cell Cx. This has the purpose of rapidly reducing undervoltages and overvoltages.

Thus, for detecting an under voltage or over voltage in the cell/group of cells, in addition to the diagnosing/monitoring function, a non-constant power course of the transfer power of the DC/DC converter 5 is implemented over the cell voltage $U_{cell}$. In the event that the rail voltage $U_{in}$ is between the enable level $U_{enable}$ and the low level $U_{low}$ or between the high level $U_{high}$ and the maximal level $U_{max}$, either the normal or preferably the higher transfer power is demanded. As an alternative to the DC/DC converter 5, a circuit can be implemented as the switch unit which impresses only the current on the rail line R, without containing a balancing function or only a partial function (such as a one-sided/unidirectional balancing).

Figure 6:
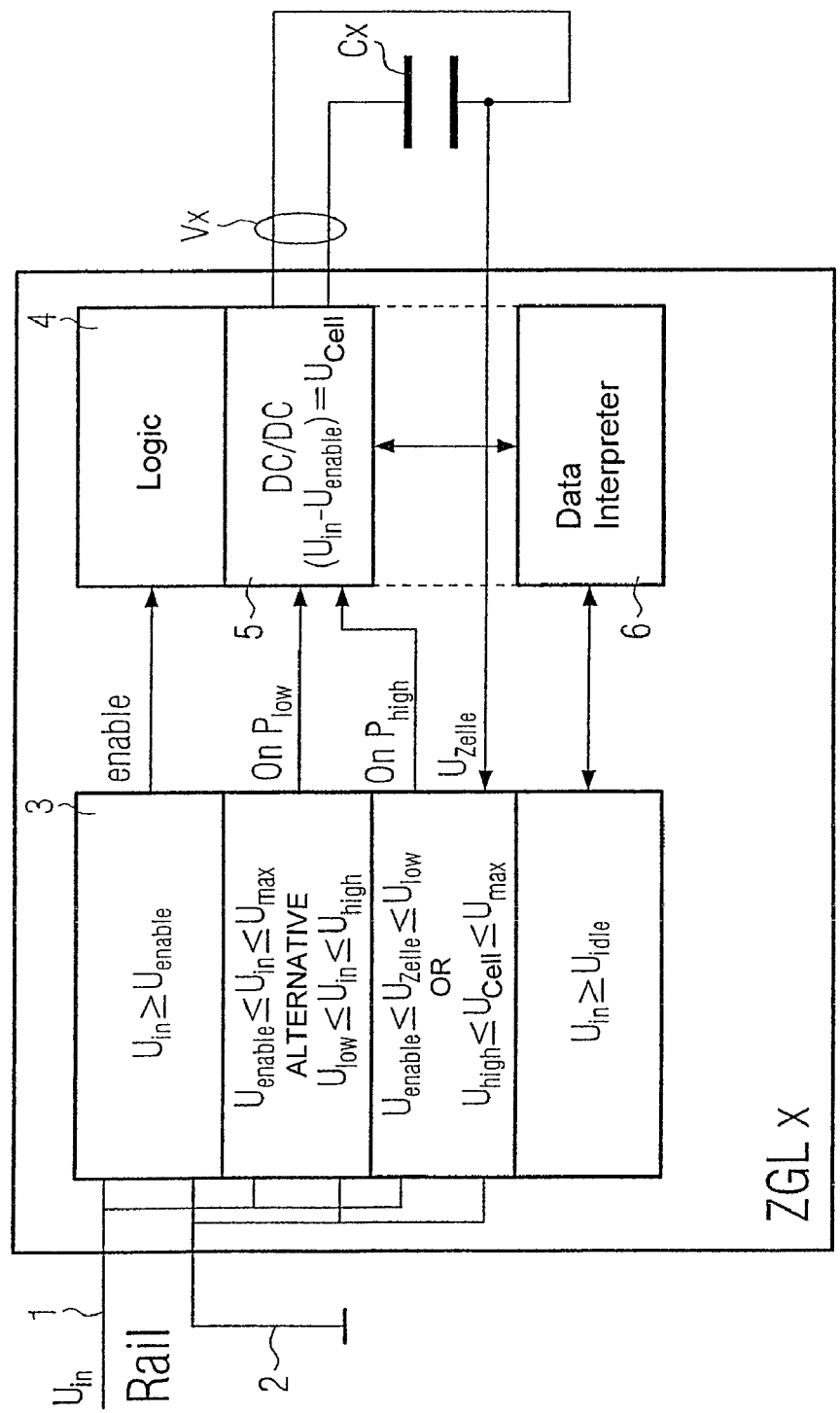
FIG. 6 is a view of a preferred embodiment of the communication function according to the invention.

FIG. 6 illustrates a preferred embodiment of the communication function according to the invention. In addition to the function illustrated in FIG. 5 and described in connection with the latter, the cell group logic ZGLx comprises a data interpreter 6 which is supplied with the rail voltage $U_{in}$ impressed on the rail line R when the voltage comparator unit 3 determines that the rail voltage $U_{in}$ is greater than or equal to the idle level $U_{idle}$. In this case, data are transmitted which are evaluated by the data interpreter 6, whereby the latter can trigger the switch unit 5; that is, here, the DC/DC converter.

Figure 7:
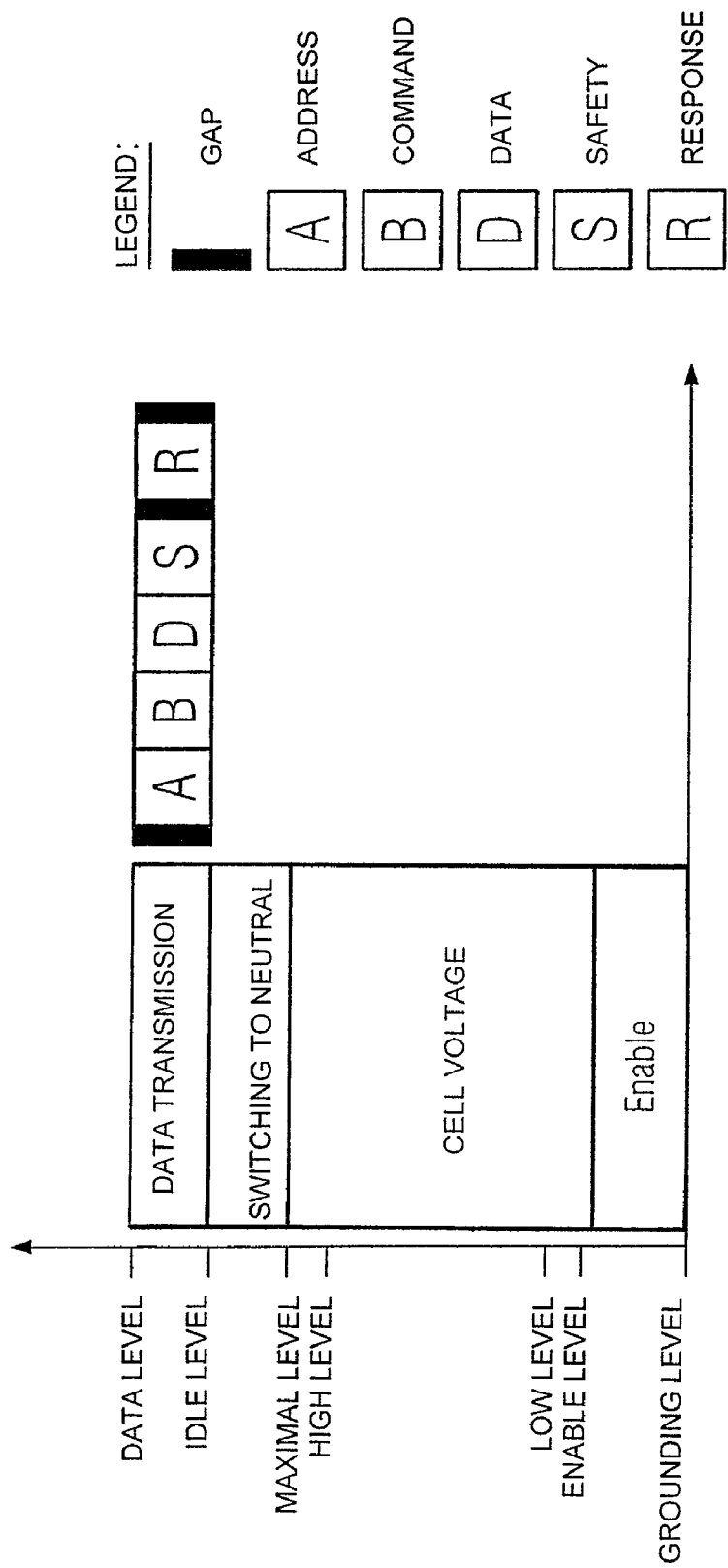
FIG. 7 is a view of a preferred embodiment of the data coding according to the invention in the case of the communication function according to the invention.

FIG. 7 illustrates a preferred embodiment of the principle of data coding of the communication function according to the invention. For the data transmission, the central logic ZL4 here sends data blocks A, B, D and S to the cell group logic(s) SGL, whereupon the latter sends a data block R as a response. The data blocks sent by the central logic ZL comprise a data block for the address A, a data block for a command B, a data block for data D and a data block for the safety function S.

Figure 8:
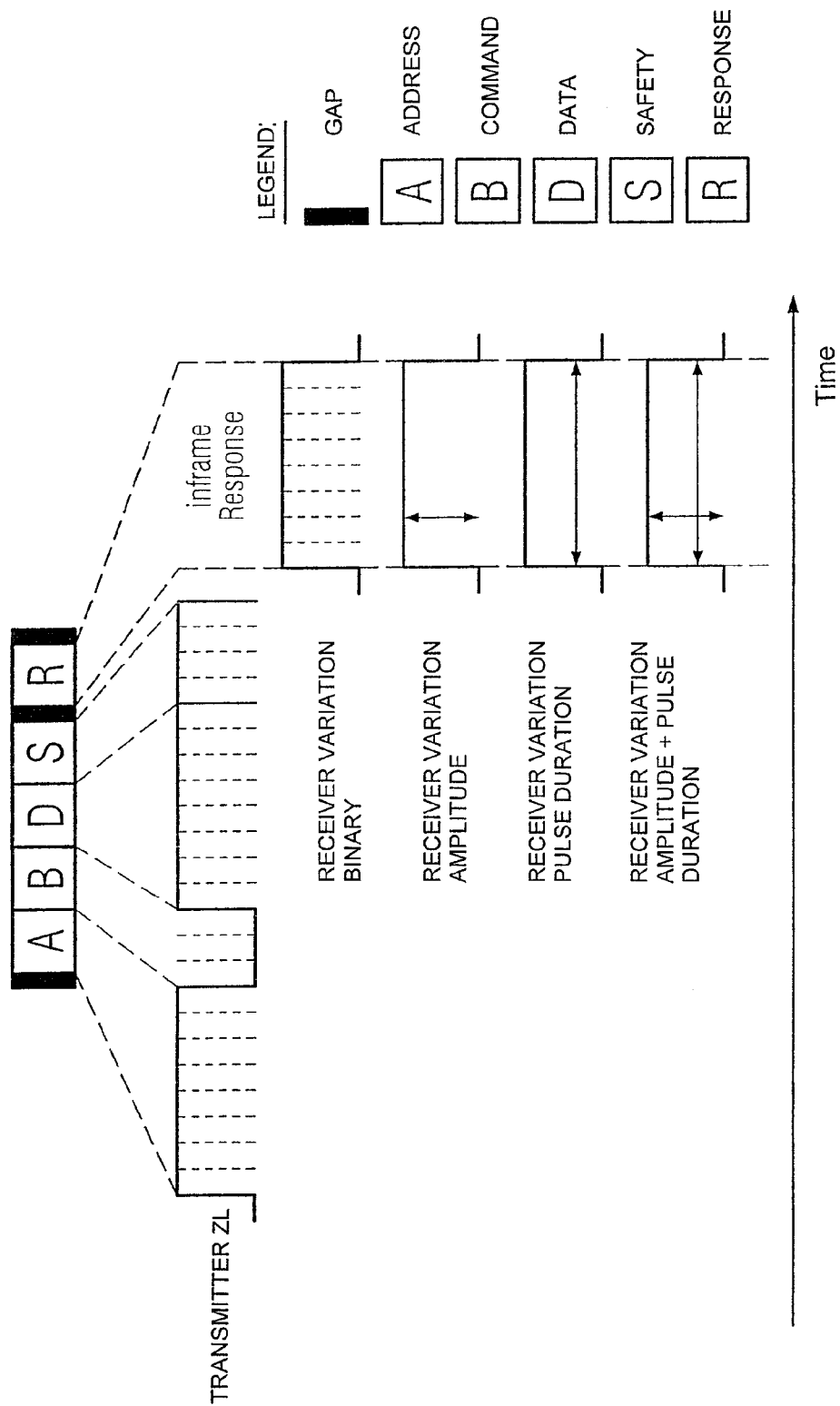
FIG. 8 is a view of a preferred embodiment of the data coding in the case of the communication function according to the invention.

FIG. 8 illustrates preferred embodiments of the data coding of the communication function according to the invention. In a data frame described by the five data blocks described in connection with FIG. 7, the permitted voltage level difference is used to build up, a data communication which, as described above, comprises the address, the command, the data, the safety and the response. In the illustrated example, the address has a length of 8 time slots; the command has a length of 3 time slots; the data have a length of 8 time slots; the safety has a length of 4 time slots; and the response given within the data frame has a length of 8 time slots. The response can take place in a binary, amplitude-modulated, pulse-duration-modulated or amplitude- and pulse-duration-modulated fashion. When a binary receiver response is implemented, a known data protocol can be used, while special solutions are implemented in the other variations.

By means of the communication mechanism, a charge of the cells can be maintained in the standing operation, and a charging and discharging or charge reversal between the individual cells as well as a diagnosis and a monitoring of the individual cells can take place.

In the event that the maintaining of the charge of the cells in the standing operation does not take place by a simple application of the target voltage of the cells to the rail line R, in which case the balancing mechanism is active, as illustrated in FIG. 4 and described in connection with the latter, a fixed or variable voltage threshold with its own function part can be used. Here, the activation takes place by way of the communication mechanism by means of a separate data command.

The charging and discharging or the charge reversal between the individual cells can also take place by way of the balancing function illustrated in FIG. 4 and described in connection with the latter. As an alternative, an activation by means of the communication mechanism can take place by way of a separate data command.

The monitoring of the individual cells/groups for the diagnosis/the monitoring of the individual cells preferably comprises the internal resistance, the cell capacitance, the temperature and the voltage. The temperature sensor may either be separate or may be integrated on the logic. The voltage and the temperature can be measured directly, while the internal resistance and the cell capacitance have to be preprocessed. The information transmission to the central logic preferably takes place by way of the communication mechanism. The energy storage interface according to the invention permits a scalability of the functions/logic, a cost-effective linking of different sensors, a standardized intelligent energy storage cell, a minimizing of the external connection technique, a favorable arrangement from an electromagnetic compatibility viewpoint and an improved recycling capability.

Thus, according to the invention, for monitoring and/or controlling or automatically controlling the voltage of at least one group of cells in a cell compound of an energy storage device, particularly an energy storage device in an onboard power supply system of a motor vehicle, a data communication is carried out between a central logic and a cell group logic by way of the rail line connecting the latter, in which case voltage levels exist between an idle level situated at or above a maximal voltage level, up to which the cell group logic exchanges energy with the rail line for charging or discharging the cell group, and a data level situated above the idle level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of monitoring and controlling a voltage of at least one group of cells in a cell compound of an energy storage device in an onboard power supply system of a motor vehicle, comprising the acts of:
   connecting a cell group logic to the group of cells by a supply line by which the group of cells is charged or discharged;
   monitoring with the cell group logic the voltage of the group of cells;
   controlling with the cell group logic charging or discharging of the group of cells, where the cell group logic takes energy from a rail line to charge the group of cells or feeds energy to the rail line from the group of cells;
   conducting a data communication between the cell group logic and at least one of another cell group logic and a central logic on the rail line at voltage levels above an idle voltage level which is equal to or greater than a predetermined maximal voltage level below which the group of cells is charged or discharged; and
   switching the cell group logic to active when the rail line voltage is determined to be above an enable voltage level which below the predetermined maximal voltage level.

2. The method according to claim 1, further comprising the act of:
   transmitting power at or above a first power level between the rail line and the supply line when the rail voltage is determined to be greater than one of the enable voltage level and a low voltage level greater that the enable voltage level, and lower than a high voltage level which is less than or equal to the predetermined maximal voltage level.

3. The method according to claim 2, further comprising the act of:
   transmitting power at or above a second power level greater than the first power level between the rail line and the supply line when a cell group voltage is above the enable voltage level and below the low voltage level, or above the high voltage level and below the predetermined maximal voltage level.

4. The method according to claim 3, wherein
   the group of cells is one of a plurality of cell groups, and
   supply lines of each of the plurality of cell groups are connected with the rail line such that power is at least one of transmitted between the plurality of cell groups, and transmitted between the plurality of cell groups and the rail line.

5. The method according to claim 4, wherein
   the data communication includes data blocks for at least one of an address, a command, data, a safety function and a response.

6. The method according to claim 5, wherein
   at least one of the data and the response include at least one of an internal resistance, a capacitance, a temperature and the voltage of a group of cells.

7. The method according to claim 6, wherein
   the data communication is conducted by at least one of binary coding, amplitude coding, pulse duration coding and an amplitude-pulse duration coding.

8. A cell group logic for monitoring and controlling the voltage of at least one group of cells in a cell compound of an energy storage device in an onboard power supply system of a motor vehicle in which the group of cells is connected by the cell group logic by way of a supply line by which the group of cells is charged or discharged, the cell group logic comprising:
   a voltage comparator unit, the voltage comparator unit configured to monitor a voltage on a rail line and to carry out a data communication by way of the rail line between the cell group logic and at least one of another cell group logic and a central logic on the rail line at voltage levels above an idle voltage level which is equal to or greater than a predetermined maximal voltage level below which the group of cells is charged or discharged, wherein
   a voltage comparator unit switches the cell group logic to active when the rail line voltage is above an enable voltage level which is below the predetermined maximal voltage level.

9. The cell group logic according to claim 8, further comprising
   a switch unit,
   wherein
   the switch unit is controlled by the voltage comparator unit to connect the supply line of the group of cells to permit a power transfer between the group of cells and the rail line, and
   the voltage comparator unit determines whether the power transfer is of removal of energy from, or the feeding of energy to, the rail line by monitoring voltage levels on the rail line and a cell group voltage.

10. The cell group logic according to claim 9, wherein
    the data communication is conducted by at least one of binary coding, amplitude coding, pulse duration coding and an amplitude-pulse duration coding.

11. A central logic for monitoring and controlling a voltage of at least one group of cells in a cell compound having at least one cell group logic in an energy storage device in an onboard power supply system of a motor vehicle, the group of cells being connected with the cell group logic by a supply line by which the group of cells is charged or discharged, the cell group logic monitoring and controlling the voltage of the group of cells by charging or discharging of the group of cells by taking energy from a rail line or feeding energy to the rail line, wherein a data communication takes place between the cell group logic and the central logic by way of the rail line, and a voltage converter unit carries out data communication by way of the rail line when the voltage converter unit determines the presence of voltage levels above an idle level equal to or greater than a predetermined maximal voltage level below which the group of cells is charged or discharged, and a data voltage level greater than the idle voltage are impressed upon the rail line by the central logic.

12. The central logic according to claim 11, further comprising:

a control unit which drives the voltage converter unit to impress a rail voltage which is greater than an enable voltage level ($U_{enable}$) below the predetermined maximal voltage level in order to switch the cell group logic to active.

13. The central logic according to claim 12, wherein the control unit drives the voltage converter unit to impress a rail voltage which is greater than the enable voltage level such that the cell group logic connects the supply lines of different cell groups so as to transmit power between at least one of different cell groups and at least one cell group and the rail line.

14. The central logic unit according to claim 12, wherein the control unit drives the voltage converter unit to carry out the data communication between the cell group logic and the central logic on the rail line.

15. The central logic unit according to claim 11, wherein the data communication is conducted by at least one of binary coding, amplitude coding, pulse duration coding and an amplitude-pulse duration coding.

* * * * *